US011607755B2

(12) United States Patent
Stranz et al.

(10) Patent No.: US 11,607,755 B2
(45) Date of Patent: Mar. 21, 2023

(54) FIXTURE ASSEMBLY FOR WELDING OPERATIONS

(71) Applicants: MAGNA INTERNATIONAL INC., Aurora (CA); Andreas Stranz, Reichenau an der Rax (AT); Florian Hanschmann, Perchtoldsdorf (AT)

(72) Inventors: Andreas Stranz, Reichenau an der Rax (AT); Florian Hanschmann, Perchtoldsdorf (AT)

(73) Assignee: MAGNA INTERNATIONAL INC., Aurora (CA)

( * ) Notice: Subject to any disclaimer, the term of this patent is extended or adjusted under 35 U.S.C. 154(b) by 88 days.

(21) Appl. No.: 16/760,619

(22) PCT Filed: Nov. 29, 2018

(86) PCT No.: PCT/CA2018/000229
§ 371 (c)(1),
(2) Date: Apr. 30, 2020

(87) PCT Pub. No.: WO2019/104412
PCT Pub. Date: Jun. 6, 2019

(65) Prior Publication Data
US 2021/0178529 A1 Jun. 17, 2021

Related U.S. Application Data

(60) Provisional application No. 62/591,950, filed on Nov. 29, 2017.

(51) Int. Cl.
*B23K 37/04* (2006.01)
*B23K 26/26* (2014.01)
(Continued)

(52) U.S. Cl.
CPC .......... *B23K 37/0461* (2013.01); *B23K 26/26* (2013.01); *B23K 37/047* (2013.01);
(Continued)

(58) Field of Classification Search
CPC .... B32K 26/24; B23K 37/0461; B23K 26/26; B23K 37/0408; B23K 37/0443;
(Continued)

(56) References Cited

U.S. PATENT DOCUMENTS 5,023,427 A * 6/1991 Neiheisel ........... B23K 37/0408
228/49.4
5,428,331 A * 6/1995 Graner ................ B23Q 3/1546
204/DIG. 5
(Continued)

FOREIGN PATENT DOCUMENTS

CA 2980093 A1 9/2016
CN 105234616 B * 3/2017 ......... B23K 37/0408
(Continued)

OTHER PUBLICATIONS

English Translation of CN-105234616-B (Year: 2017).*
English Translation of JP-WO2016151894-A1 (Year: 2017).*
Machine English Translation of EP-0811458-A1 (Year: 1997).*

*Primary Examiner* — Sang Y Paik
*Assistant Examiner* — Erwin J Wunderlich
(74) *Attorney, Agent, or Firm* — Dickinson Wright PLLC (57) ABSTRACT

A fixture assembly for supporting a plurality of blanks during a welding operation. The fixture assembly includes a frame. A plurality of electromagnets are positioned on the frame for supporting the blanks and for drawing the blanks toward the electromagnets to secure the blanks into a desired position. A plurality of intensifiers are moveably connected to the frame for selectively overlying the top face of one of the electromagnets for clamping the blank against the electromagnet to intensify a magnetic force provided by the
(Continued)

electromagnet. A plurality of electromagnet adjusters are each coupled with the frame and with at least one of the electromagnets for moving the electromagnets relative to the frame. A plurality of adjusting pins are each connected to the frame and moveable relative to the frame for adjusting a position of the blanks.

16 Claims, 8 Drawing Sheets

(51) Int. Cl.
    *B23Q 3/154*     (2006.01)
    *B25B 11/00*     (2006.01)
    *B23K 37/047*     (2006.01)
    *B23K 101/18*     (2006.01)

(52) U.S. Cl.
    CPC ...... *B23K 37/0408* (2013.01); *B23K 37/0443* (2013.01); *B23Q 3/1543* (2013.01); *B23Q 3/1546* (2013.01); *B25B 11/002* (2013.01); *B23K 2101/185* (2018.08)

(58) Field of Classification Search
    CPC ............ B23K 2101/185; B23K 37/047; B23Q 3/1543; B23Q 3/1546; B25B 11/002
    USPC .......................................................... 219/121
    See application file for complete search history.

(56) References Cited

U.S. PATENT DOCUMENTS

| | | | |
|---|---|---|---|
| 5,630,269 A * | 5/1997 | Wasserbaech | B23K 37/0408 29/559 |
| 6,011,240 A * | 1/2000 | Bishop | B23K 26/26 219/121.63 |
| 6,031,199 A * | 2/2000 | Ream | B23K 26/26 219/121.63 |
| 7,999,645 B2 | 8/2011 | Sarda | |
| 9,555,522 B2 | 1/2017 | Evans et al. | |
| 9,969,077 B2 * | 5/2018 | Mabee | B23Q 1/015 |
| 10,486,277 B2 * | 11/2019 | Kwon | H01F 7/0257 |
| 11,123,818 B2 * | 9/2021 | Riquelme | B23K 26/322 |
| 2009/0283946 A1 | 11/2009 | Cai et al. | |
| 2016/0184929 A1 * | 6/2016 | Stäubli | B23K 26/24 219/121.64 |

FOREIGN PATENT DOCUMENTS

EP            0811458 A1 * 12/1997
JP     WO2016151894 A1 * 9/2017 ............ B23K 9/025

* cited by examiner

FIXTURE ASSEMBLY FOR WELDING OPERATIONS

CROSS-REFERENCE TO RELATED APPLICATIONS

This U.S. National Stage Patent application claims the benefit of PCT International Patent Application Serial No. PCT/CA2018/000229 filed Nov. 29, 2018 entitled "Fixture Assembly For Welding Operations" which claims the benefit of U.S. Provisional Patent Application Ser. No. 62/591,950 filed on Nov. 29, 2017, and titled "Fixture Assembly For Welding Operations", the entire disclosures of the applications being considered part of the disclosure of this application and hereby incorporated by reference.

BACKGROUND OF THE INVENTION

1. Field of the Invention

A fixture assembly for supporting two or more blanks to one another during a welding operation.

2. Description of the Prior Art

Laser welding is known in manufacturing as an efficient and effective method of connecting two or more blanks to one another. Typically, a fixture assembly is provided for securing the blanks into a desired position during the laser welding operation. The desired position typically includes two or more surfaces of the blanks disposed in alignment with one another such that the union between the blanks may be welded. Conventional fixture assemblies typically utilize a series of clamps for holding the blanks in place. An issue with such fixture assemblies is that minor variations in blank dimensions can cause the blanks to be misaligned with one another once they are clamped in place, thus creating gaps that cannot be laser welded without adding additional material, e.g., filler wire. Accordingly, excess time and materials are often required to execute a successful laser welding operation. As such, there remains a need for improvements to fixture assemblies for laser welding and other welding operations.

SUMMARY OF THE INVENTION

A fixture assembly for supporting a plurality of blanks during a welding operation. The fixture assembly includes a frame. A plurality of electromagnets are positioned on the frame for supporting the blanks and for drawing the blanks toward the electromagnets to inhibit relative movement between the blanks and the electromagnets upon being activated. A plurality of intensifiers are moveably connected to the frame for selectively overlying the electromagnets for being drawn toward the electromagnets over the blank to clamp the blank in place and to intensify a magnetic force provided by the electromagnets when the electromagnets are activated. At least one adjusting pin is connected to the frame and moveable relative to the frame for adjusting a position of the blanks relative to the electromagnets prior to activating the electromagnets. A plurality of electromagnet adjusters are each coupled to the frame and at least one of the electromagnets for moving the at least one of the electromagnets relative to the frame after the electromagnets have been activated for closing any gaps between the blanks.

According to another aspect of the disclosure, a method for positioning a plurality of blanks on a frame for a welding operation is provided. The method includes positioning at least two blanks on top of at least two electromagnets being positioned on top of the frame. The method also includes pushing the at least two blanks relative to the frame into a preliminary position with at least one adjusting pin. The method also includes positioning a plurality of intensifiers of a magnetic material over each of the electromagnets and blanks. The method also includes activating the electromagnets to draw the blanks and intensifiers toward the electromagnets to inhibit relative movement between the electromagnets and the blanks. The method also includes moving at least one of the electromagnets from the preliminary position with at least one electromagnet adjuster to eliminate any gap between the pair of blanks such that the blanks may be welded to one another.

The invention in its broadest aspect therefore provides a fixture assembly and method of using the same that may be quickly and efficiently adjusted to eliminate gaps between blanks prior to welding operations. More particularly, the arrangement of electromagnet adjusters and adjusting pins allows the blanks and electromagnets to be adjusted in various directions into a desired fixed position. Furthermore, the electromagnets and intensifiers allow the blanks to be selectively held in the fixed position during the welding operation.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a fixture assembly 20 is provided for laser welding a plurality of blanks 22, 23, 25, 27 to one another. According to the example embodiment, the blanks 22, 23, 25, 27 each generally have a rectangular shaped cross-section, and are positioned on the fixture assembly 20 such that edges of the blanks 22 may be welded to one another. It should be appreciated, however, that the subject fixture assembly 20 could be used to weld blanks 22, 23, 25, 27 together that have different shapes. It should further be appreciated that the subject fixture assembly may be utilized to position blanks 22, 23, 25, 27 during other types of welding operations.

As illustrated in FIGS. 1-7, the fixture assembly 20 includes a frame 26. In the example embodiment, the frame 26 is planar and generally square-shaped. The frame 26 defines a perimeter with four edges 24, four corners 28 and a center. The frame 26 has an upper surface 30 and a lower surface 32 and defines an opening 34 at its center.

A plurality of electromagnets 36 are positioned on the upper surface 30 of the frame 26. Each of the electromagnets 36 has a generally cuboid shape with a top face 38 for supporting the blank 22, 23, 25, 27 and for drawing the blank 22 toward the top face 38. A controller 40 is electrically connected to the electromagnets 36 and is configured to selectively activate the electromagnets 36 to create a magnetic force for drawing the blank 22 toward the electromagnet 36.

The plurality of electromagnets 36 includes four pairs 42, 44, 46, 48 of electromagnets 36, with each pair positioned adjacent to one of the edges 24 of the frame 26. Namely, a first pair 42, a second pair 44, a third pair 46 and a fourth pair 48 of electromagnets 36 are provided. The electromagnets 36 of each pair are aligned in spaced and parallel relationship with one another. It should be appreciated that more or fewer pairs of electromagnets 36 could be utilized.

A plurality of generally rectangular shaped intensifiers 50 of a metal material, such as steel, are provided. Each intensifier 50 overlies the top face 38 of one of the electromagnets 36 such that each of the electromagnets 36 is covered by one of the intensifiers 50. The intensifiers 50 are each positioned such that, when the electromagnets 36 are activated, they are drawn toward the top face 38 of the electromagnet 36 over the blank 22 to clamp the blank 22, 23, 25, 27 in place in order to intensify the magnetic force provided by the electromagnet 36, especially for blanks 22 that are of thin gauge metal.

A plurality of supports 54, 56 each interconnect one of the intensifiers 50 with the upper surface 30 of the frame 26. The supports 54, 56 each include a hydraulic lifting cylinder 54 for adjusting the height of the intensifier 50 in a vertical direction that is perpendicular to the frame 26, and a hydraulic rotary cylinder 56 for pivoting the intensifier 50 about a vertical axis A that extends in the vertical direction. It should be appreciated that the rotary cylinder 56 allows the intensifier 50 to be pivoted between an overlying position in which it overlies the electromagnet 36/blank 22, 23, 25, 27, and a spaced position in which the intensifier 50 does not overly the electromagnet 36/blank 22, 23, 25, 27.

Figure 5:
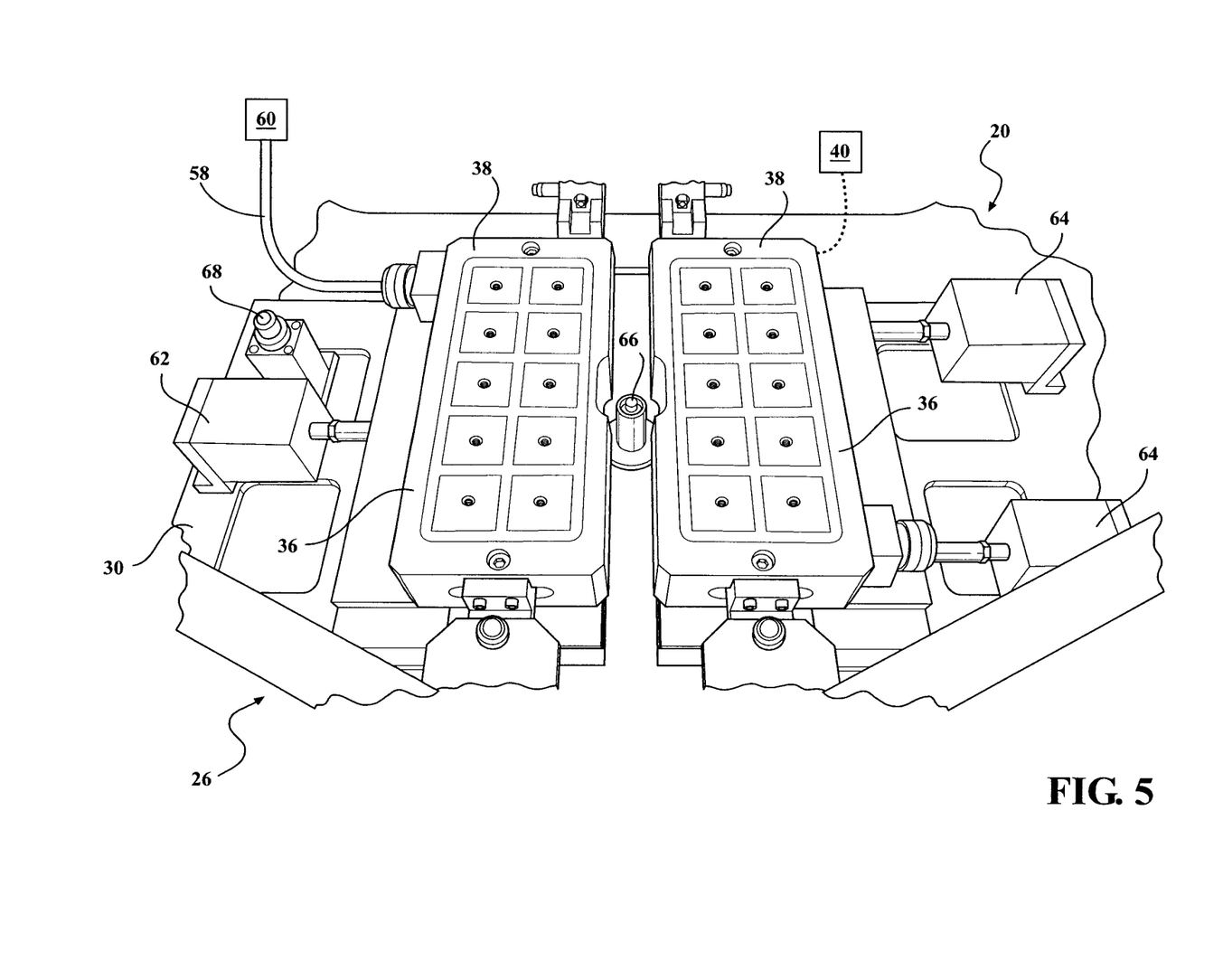
FIG. 5 is a perspective view of a pair of electromagnets of a third example embodiment of a fixture assembly.
Figure 6:
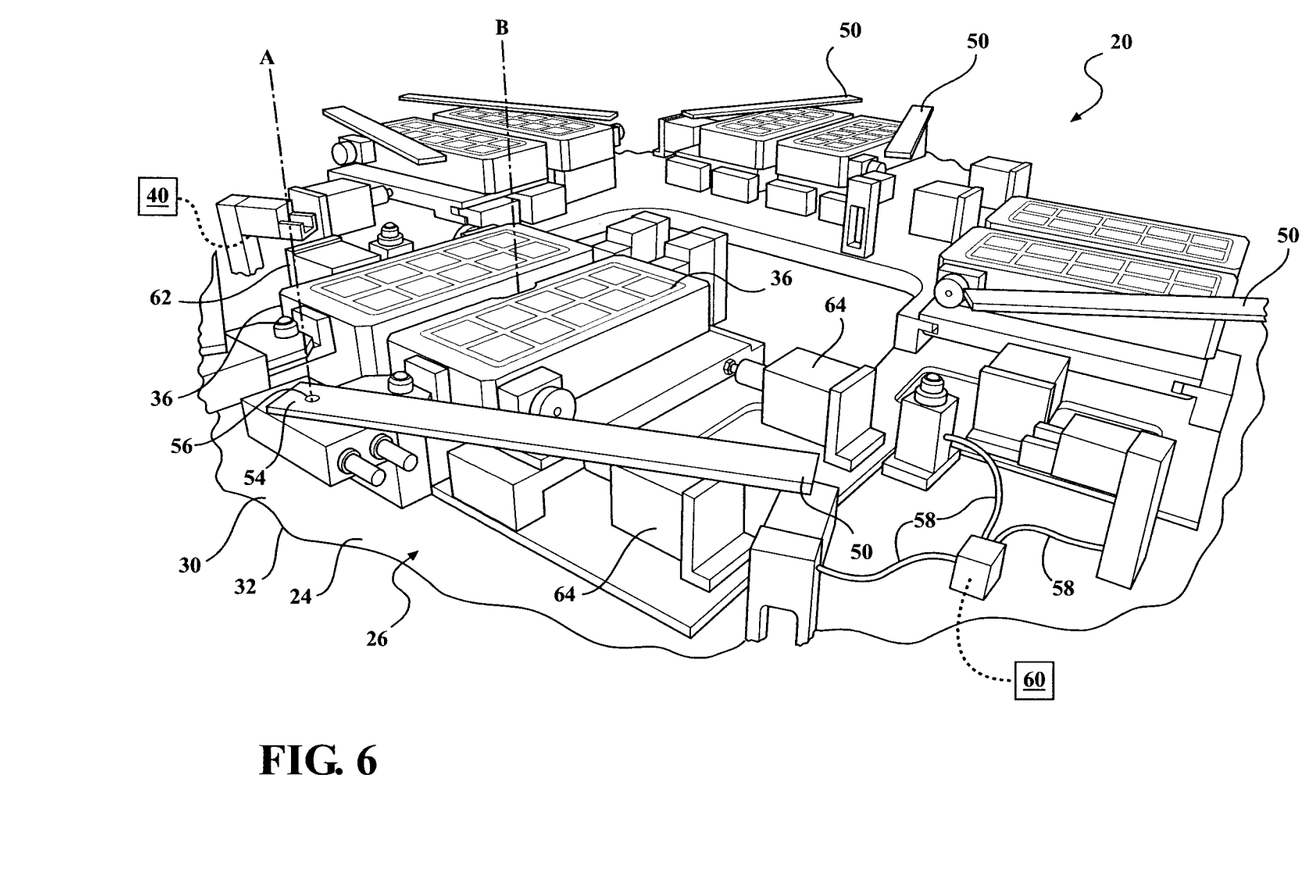
FIG. 6 is a perspective view of the third example embodiment of a fixture assembly.
Figure 7:
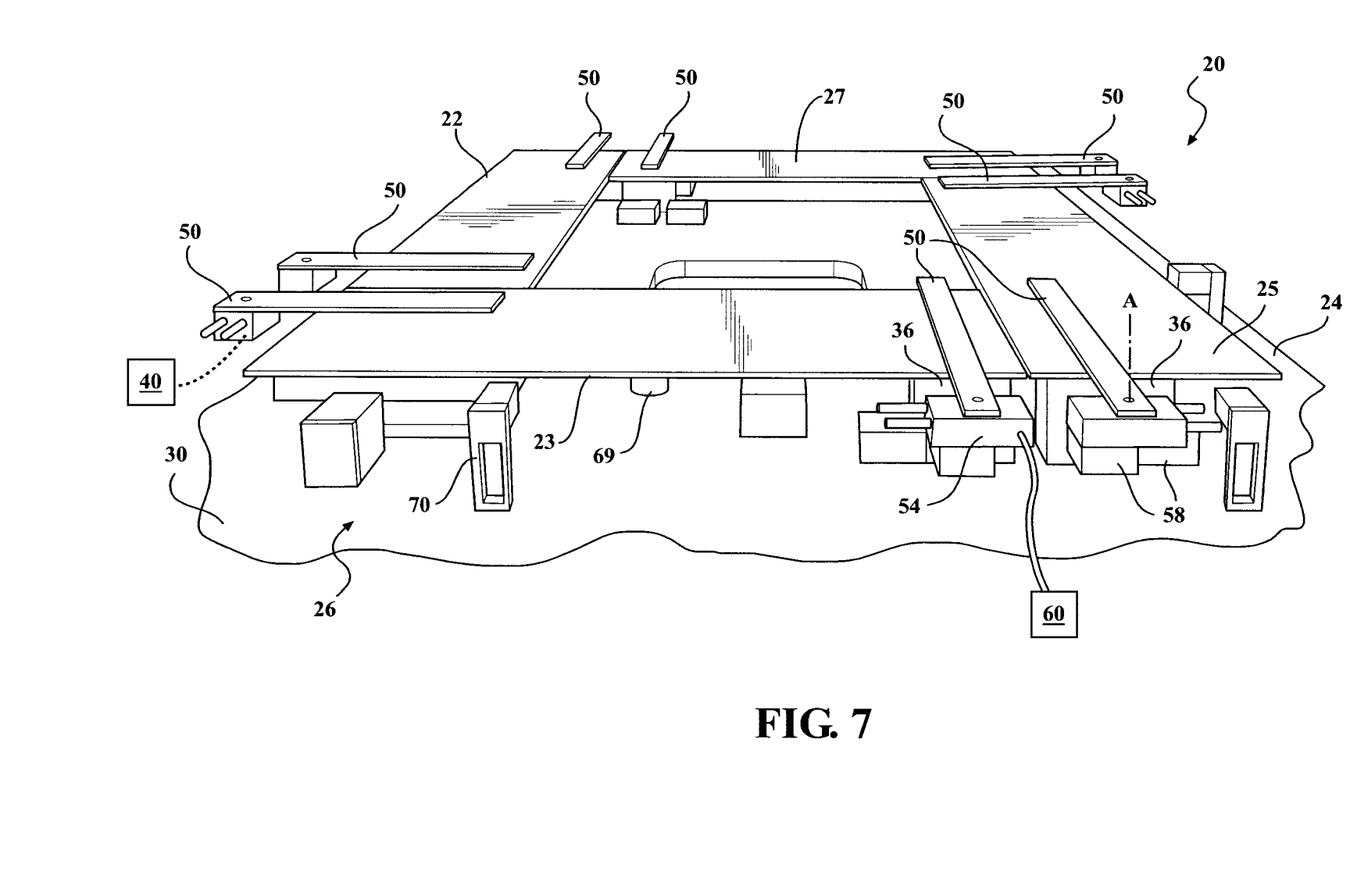
FIG. 7 is a perspective view of the fixture assembly of FIG. 6 with a plurality of blanks positioned over the electromagnets.

As best illustrated in FIGS. 5-7, a plurality of hydraulic lines 58 (schematically shown) are connected to the supports 54, 56 for providing hydraulic fluids to the support 54, 56 for actuating the lifting cylinders 54 and the rotary cylinders 56. The hydraulic lines 58 are also connected to a fluid source 60 (schematically shown) for providing the fluid to the hydraulic lines 58. The supports 54, 56 are each electrically connected to the controller 40 for selectively actuating the rotary and lifting cylinders 56, 54.

A plurality of electromagnet adjusters 62, 64 are coupled with the frame 26 and the electromagnets 36 for moving the electromagnets 36 relative to the frame 26 into a desired position. The electromagnet adjusters 62, 64 include a hydraulic rotary adjuster 62 positioned adjacent to one of the electromagnets 36 of at least the first and second pairs 42, 44 of the electromagnets 36. The rotary adjusters 62 are configured to rotate the pair of electromagnets 36 about an upward axis B that extends parallel to the vertical axis A.

The rotary adjusters 62 are connected to the hydraulic lines 58 for receiving hydraulic fluid. The rotary actuator adjusters 62, 64 are also electrically connected to the controller 40 for selectively actuating the rotary adjusters 62. The electromagnet adjusters 62, 64 further include a pair of hydraulic sliding adjusters 64 disposed adjacent to each of the pairs of electromagnets 36 for pushing the one of the electromagnets 36 horizontally, i.e., parallel with the frame 26, relative to the other electromagnet 36 of the same pair. The sliding adjusters 64 may also be configured to push both of the electromagnets 36 at the same time. Each of the sliding adjusters 64 are connected to the hydraulic lines 58 for receiving hydraulic fluid. Furthermore, each of the sliding adjusters 64 are electrically connected to the controller 40 for selectively actuating the sliding adjusters 64.

A hydraulic central vertical adjustment pin 66 is positioned between each of the pairs 42, 44, 46, 48 of electromagnets 36 for adjusting a vertical height of the blank 22 in the vertical direction. The central vertical adjustment pins 66 are connected to the hydraulic lines 58 and source of hydraulic fluid 60 for receiving the hydraulic fluid. The central vertical adjustment pins 66 are also electrically connected to the controller 40 for selectively actuating the central vertical adjustment pins 66.

A hydraulic outer vertical adjustment pin 68 is positioned adjacent to each of the pairs 42, 44, 46, 48 of electromagnets 36 for also adjusting a vertical height of the blank 22, 23, 25, 27 in the vertical direction. The outer vertical adjustment pins 68 are connected to the hydraulic lines 58 for receiving hydraulic fluid. The outer vertical adjustment pins 68 are also electrically connected to the controller 40 for selectively actuating the outer vertical adjustment pins 68.

A horizontal adjustment pin 70 is positioned adjacent to each of the outer vertical adjustment pins 68 for pushing an edge 24 of the blank 22, 23, 25, 27 to provide a rough alignment of the blank 22, 23, 25, 27 after it is positioned over the electromagnets 36. The horizontal adjustment pins 70 are connected to the hydraulic lines 58 for receiving hydraulic fluid. The horizontal adjustment pins 70 are electrically connected to the controller 40 for selectively actuating the horizontal adjustment pins 70.

Figure 1:
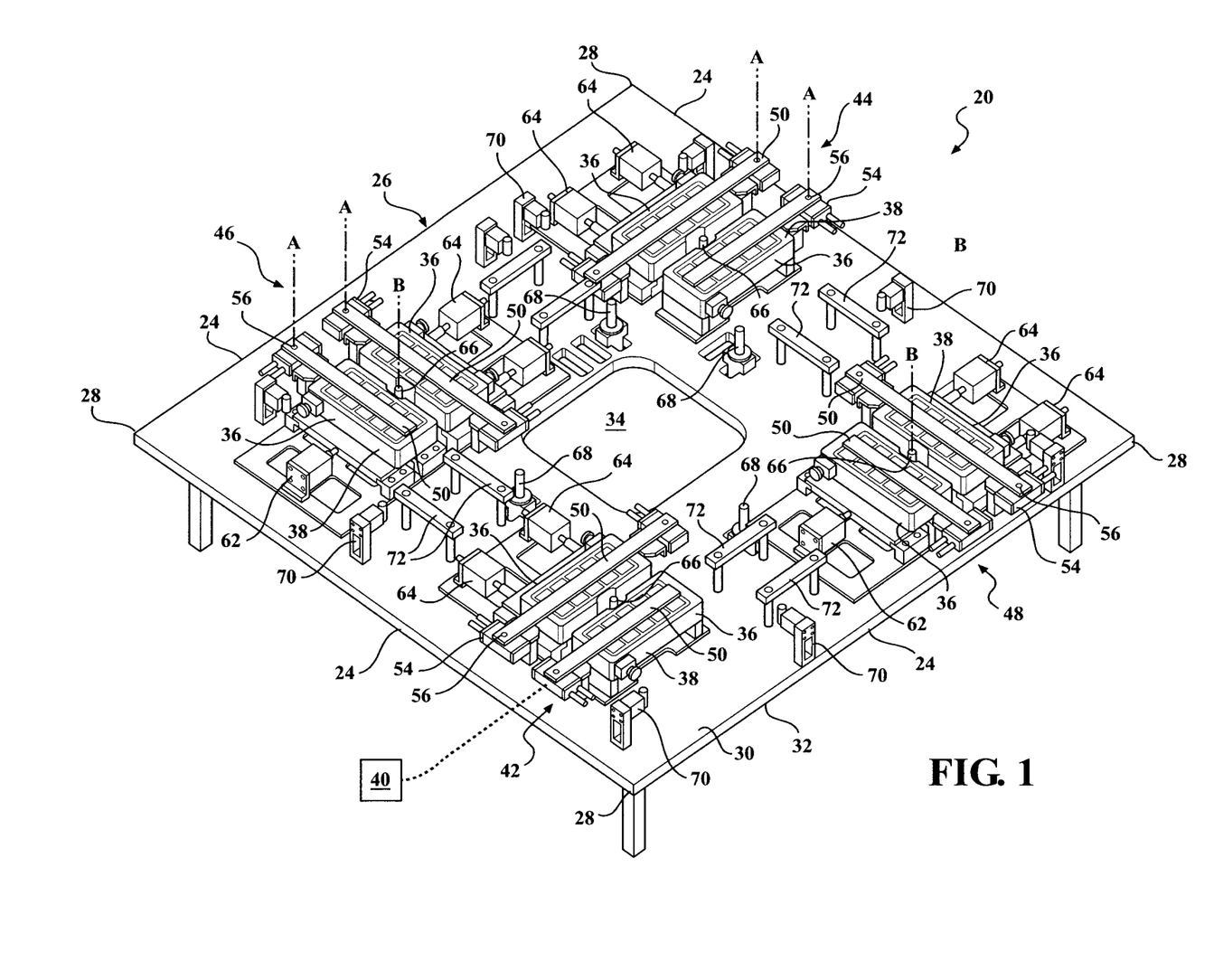
FIG. 1 is a perspective view of a first example embodiment of a fixture assembly having a first example arrangement of electromagnets.
Figure 2:
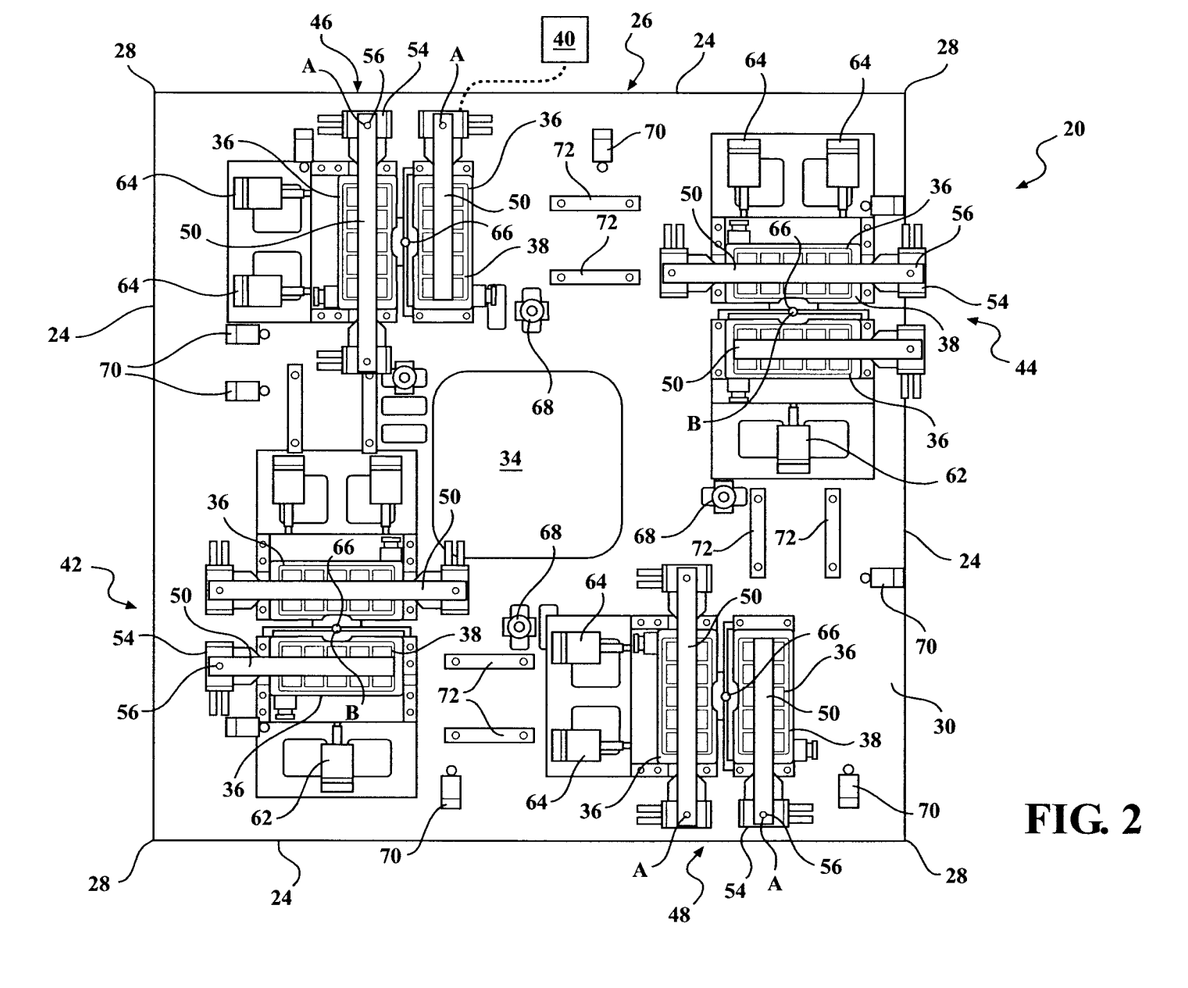
FIG. 2 is a top view of the fixture assembly of FIG. 1.
Figure 3:
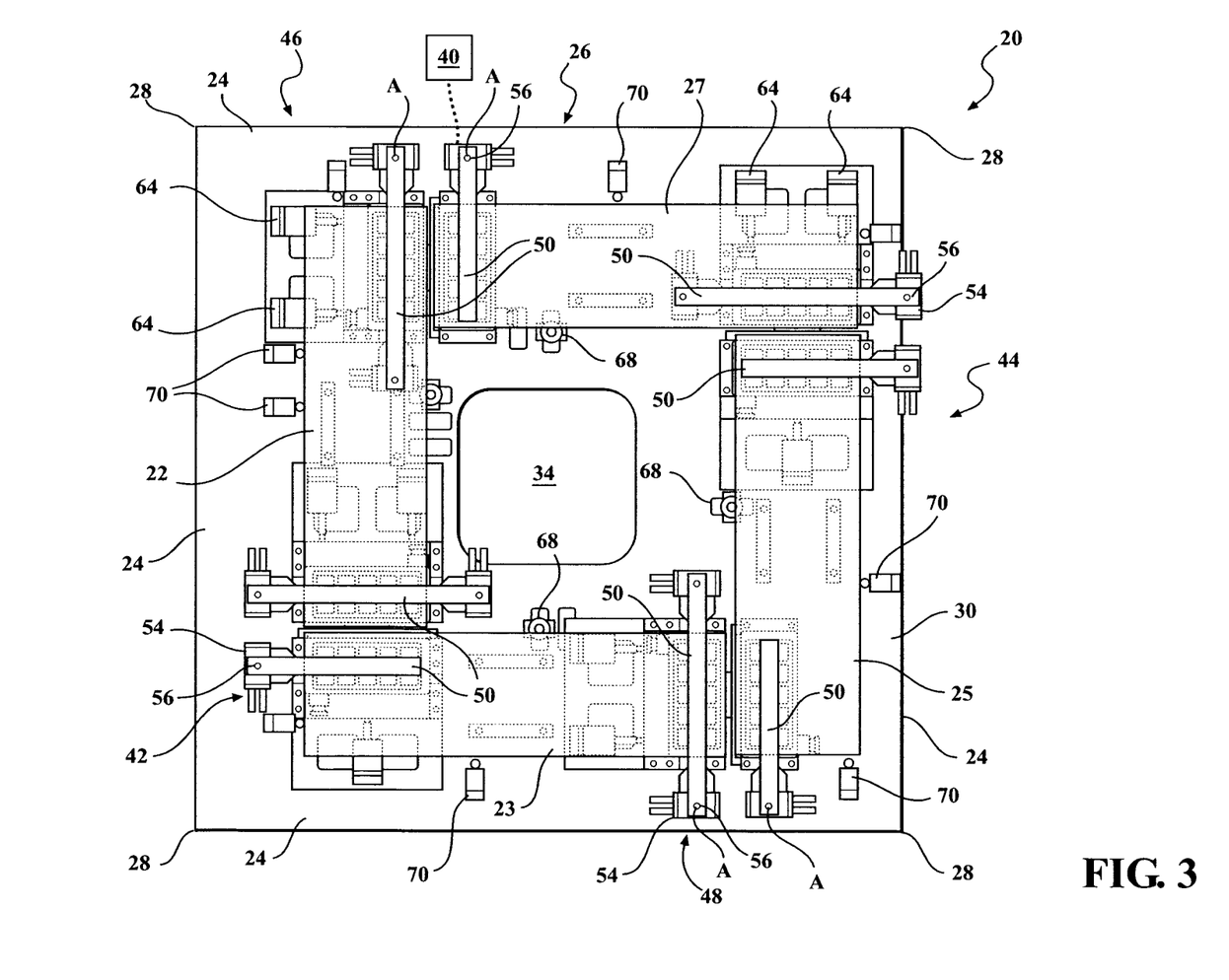
FIG. 3 is a top view of the fixture assembly of FIG. 1 with a plurality of blanks positioned over the electromagnets.
Figure 4:
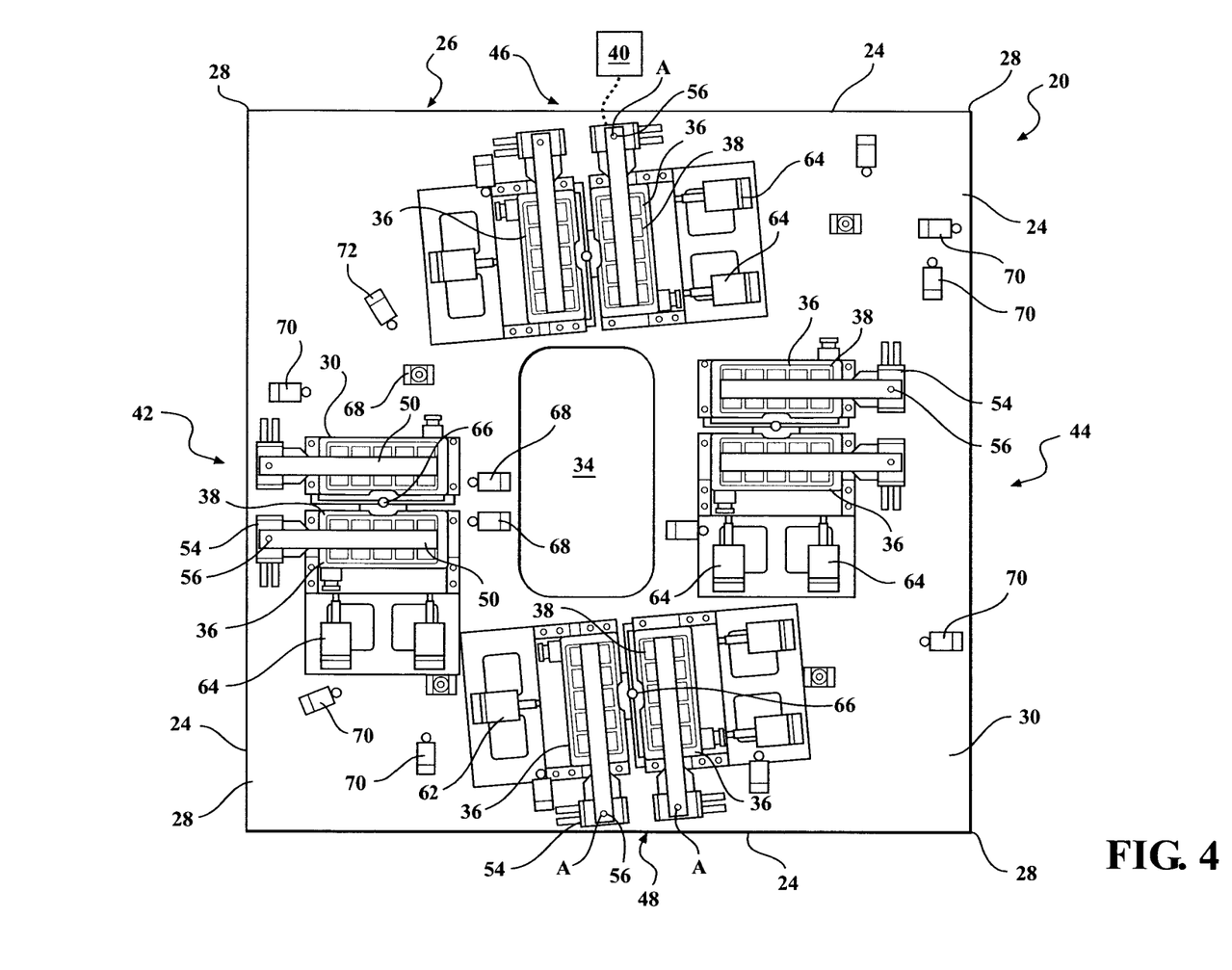
FIG. 4 is a top view of a second example embodiment of a fixture assembly having a second example arrangement of electromagnets.

As best shown in FIGS. 1-3, a plurality of platforms 72 may also be disposed against the frame 26 for supporting the blanks 22, 23, 25, 27 in the vertical direction.

Figure 8:
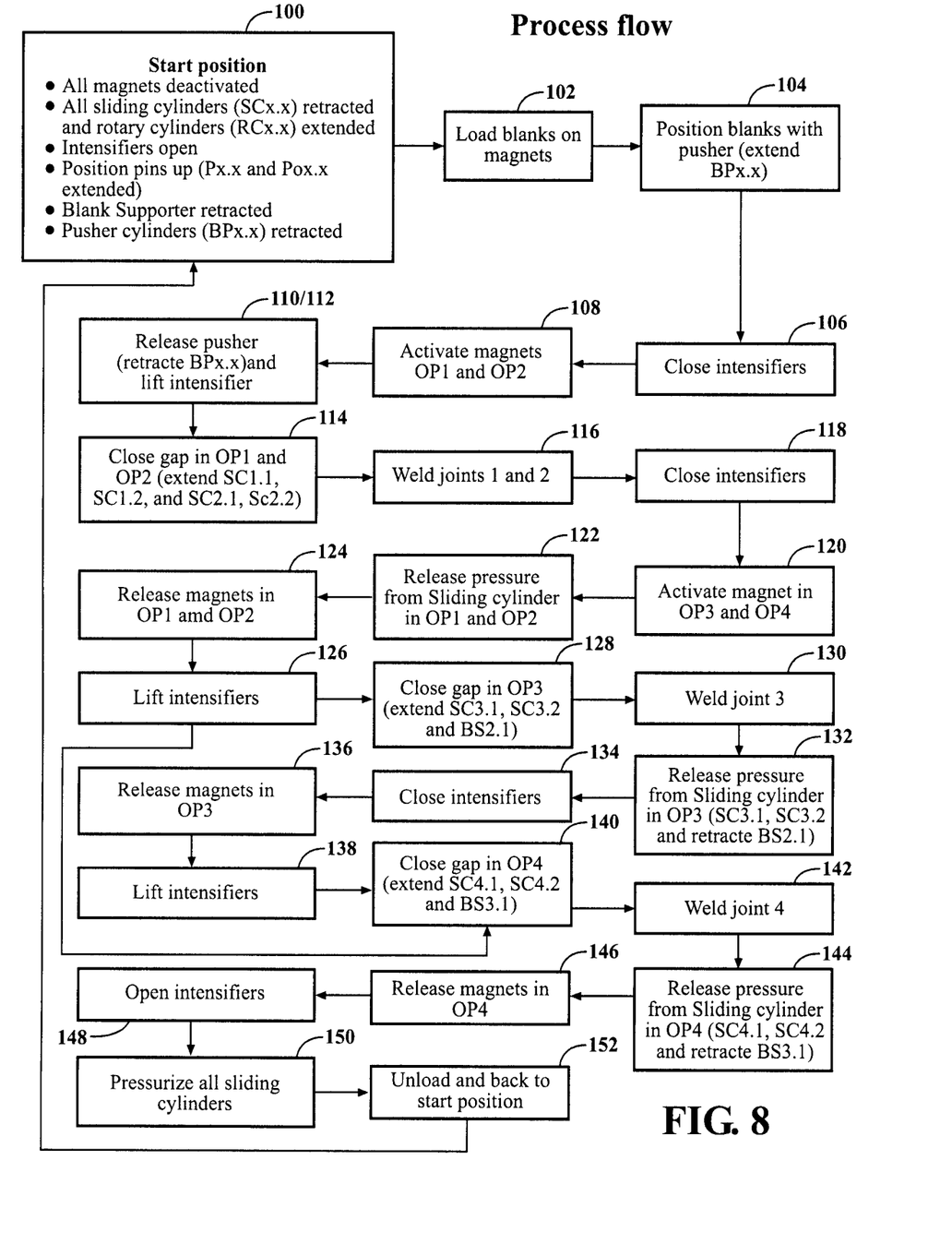
FIG. 8 is a flow diagram of an example method of using a fixture assembly.

A method of operating the subject fixture assembly 20 is presented in FIG. 8. As illustrated, the method includes 100 arranging the fixture assembly 20 in a start position. Arranging the fixture assembly 20 in the start position includes deactivating all electromagnets 36, retracting all lifting cylinders 54, extending the vertical adjustment pins 66, 68 and retracting the horizontal adjustment pins 70, rotary cylinders 56 and rotary adjusters 62. Retracting the rotary cylinders 56 pivots the intensifiers 50 into a pivoted position in which they do not overly the electromagnet 36, as demonstrated by FIG. 6.

The method continues with 102 positioning the blanks 22, 23, 25, 27 over the top faces 38 of the electromagnets 36 in a rough position. More particularly, according to the example embodiment best presented in FIGS. 1-3, a first blank 22 is positioned over one of the electromagnets 36 of the first pair 42 and one of the electromagnets 36 of the third pair 46, a second blank 23 is positioned over one of the electromagnets 36 of the first pair 42 and one of the electromagnets 36 of the fourth pair 48, a third blank 25 is positioned over one of the electromagnets 36 of the second pair 44 and one of the electromagnets 36 of the fourth pair 48, and a fourth blank 27 is positioned over one of the electromagnets 36 of the second pair 44 and one of the electromagnets 36 of the third pair 46. The blanks 22, 23, 25, 27 may initially be positioned with a robotic arm or manually by an operator.

The method continues with 104 pushing the blanks 22, 23, 25, 27 with the horizontal adjustment pins 70 into a preliminary position. The method continues with 106 activating all of the rotary cylinders 56 such that the intensifiers 50 are positioned over the blanks 22. The method proceeds with 108 activating the electromagnets 36 of the first pair 42 and the second pair 44 of electromagnets 36. The method continues with 110 releasing the horizontal adjustment pins 70 such that they no longer engage the blanks 22, and 112 lifting the intensifiers 50 with the lifting cylinders 54.

The method proceeds with 114 activating the sliding adjusters 64 of the first and second pairs 42, 44 of electromagnets 36 such that any gap between the first and second blanks 22, 23, and any gap between the fourth and third blanks 27, 25 is closed. It should be appreciated that because the third pair 46 of electromagnets 36 is not activated during such movement, the first and fourth blanks 22, 27 are able to move relative to the third pair 46 of electromagnets 36. The method continues with 116 welding the first and second blanks 22, 23 to one another, and welding the fourth and third blanks 27, 25 to one another. It should be appreciated that because the intensifiers 50 over the first and second pair 42, 44 of electromagnets 36 are in the lifted position at this time, welding material is able to flow to the gap between the first and second blanks 22, 23 and the fourth and third blanks 27, 25. The method proceeds with 118 closing the intensifiers 50 with the lifting cylinders 54.

The method continues with 120 activating the electromagnets 36 of the third and fourth pairs 46, 48 of electromagnets 36. The method then proceeds with 122 releasing the sliding adjusters 64 of the first and second pairs 42, 44 of electromagnets 36. The method then continues with 124 releasing the electromagnets 36 of the first and second pairs 42, 44 of electromagnets 36. The method then proceeds with 126 lifting the intensifiers 50 with the lifting cylinder 54. The method continues with 128 activating the sliding adjusters 64 of the third pair 46 of electromagnets 36 such that any gap between the first and fourth blanks 22 is closed. It should be appreciated that because the first pair 42 of electromagnets is deactivated at this time, the first blank 22 is able to move relative to the first pair 42 of electromagnets 42. The method proceeds with 130 welding the first and fourth blanks 22, 27 to one another. It should be appreciated that because the intensifier 50 over the third pair 46 of electromagnets 36 is in the lifted position, welding material is able to flow to the gap between the first and fourth blanks 22, 27.

The method continues with 132 releasing the sliding adjusters 64 of the third pair 46 of electromagnets 36. The method proceeds with 134 closing the intensifiers 50 with the lifting cylinders 54. The method continues with 136 releasing the electromagnets 36 in the third pair 46. The method proceeds with 138 lifting the intensifiers 50 with the lifting cylinders 54. The method continues with 140 activating the sliding adjusters 64 of the fourth pair 48 of electromagnets 36 such that any gap between the second and third blanks 23, 25 is closed. It should be appreciated that because the third pair 46 of electromagnets 36 is deactivated at this time, the fourth blank 27 is able to move relative to the third pair 46 of electromagnets 36. The method proceeds with 142 welding the second and third blanks 23, 25 to one another. Again, it should be appreciated that because the intensifier 50 over the third pair 46 of electromagnets 36 is in the lifted position, welding material is able to flow to the gap between the second and third blanks 23, 25.

The method continues with 144 releasing the sliding adjusters 64 of the fourth pair 48 of electromagnets 36. The method proceeds with 146 deactivating the fourth electromagnet 36. The method continues with 148 lifting the intensifiers 50 with the lifting cylinders 54 and rotating the intensifiers 50 into a pivoted position such that they do not overly the electromagnet 36. The method proceeds with 150 activating all of the sliding adjusters 64 such that the electromagnets 36 are moved back to their original positions. Finally the method continues with 152 removing the coupled blanks 22 from the fixture assembly 20.

It should be appreciated that the electromagnets 36 and various supports, adjusters, actuators, intensifiers, may be activated in different manners and in different orders in order to provide a desired alignment for differently shaped blanks 22 to be welded to one another. For example, the rotary adjusters 62 may rotate the electromagnets 36 at any point in the process to position the blanks 22, 23, 25, 27 in a target position.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A fixture assembly for supporting a plurality of blanks during a welding operation, said fixture assembly including:
   a frame having an upper surface extending along a plane;
   a plurality of electromagnets positioned on said upper surface of said frame, each of said electromagnets having a top face extending along a plane being parallel to said plane of said frame for supporting one of the blanks and for drawing the blank toward said top face to inhibit relative movement between the blank and said electromagnet upon being activated;
   a plurality of intensifiers moveably connected to said frame for selectively overlying said electromagnets for being drawn toward said electromagnets over the blank to clamp the blank in place and to intensify a magnetic force provided by said electromagnets when said electromagnets are activated;
   at least one adjusting pin connected to said frame and moveable relative to said frame for adjusting a position of the blanks relative to said electromagnets prior to activating the electromagnets; and
   a plurality of electromagnet adjusters each coupled to said frame and at least one of said electromagnets for moving said at least one of said electromagnets relative to said frame after said electromagnets have been activated for closing any gaps between said blanks;
   wherein said plurality of electromagnet adjusters includes at least one sliding adjuster configured to move one of said electromagnets in a horizontal direction being parallel with said plane of said frame relative to at least another of the electromagnets; and
   wherein at least one of said electromagnets is rotatable relative to said upper surface of said frame about an axis extending perpendicularly to said plane of said frame.

2. The fixture assembly as set forth in claim 1 further including a plurality of supports each moveably connecting one of said intensifiers and said frame.

3. The fixture assembly as set forth in claim 2 wherein said plurality of supports includes at least one lifting cylinder moveable in a vertical direction being perpendicular to said frame, and wherein said lifting cylinder is configured to move at least one of said intensifiers in the vertical direction.

4. The fixture assembly as set forth in claim 2 wherein said intensifiers are each pivotable about a vertical axis being perpendicular to said plane of said frame between an overlying position in which said intensifier overlies said electromagnet in a vertical direction of said vertical axis and a spaced position in which said intensifier does not overlie said electromagnet in said vertical direction for selectively clamping the blanks to the electromagnets.

5. The fixture assembly as set forth in claim 1 wherein said at least one adjusting pin includes at least one vertical adjustment pin moveable in a vertical direction being perpendicular to said plane of said frame and configured to adjust a vertical height of the blanks in said vertical direction.

6. The fixture assembly as set forth in claim 5 wherein said at least one vertical adjustment pin includes at least one central vertical adjustment pin positioned in a region between a pair of said electromagnets.

7. The fixture assembly as set forth in claim 6 wherein said at least one vertical adjustment pin includes at least one outer vertical adjustment pin positioned adjacent to a pair of said electromagnets outside of said region between said pair of said electromagnets.

8. The fixture assembly as set forth in claim 1 wherein said at least one adjusting pin includes at least one horizontal adjustment pin moveable in said horizontal direction and configured to move the blanks in the horizontal direction.

9. The fixture assembly as set forth in claim 1 wherein said plurality of electromagnets includes a plurality of pairs of electromagnets with said electromagnets of each pair aligned in spaced and parallel relationship with one another.

10. The fixture assembly as set forth in claim 9 wherein said frame is square shaped, wherein said frame defines four edges and four corners, and wherein said plurality of pairs of electromagnets includes four pairs of electromagnets with each of said pairs of electromagnets positioned adjacent to one of said edges of said frame.

11. The fixture assembly as set forth in claim 1 further including a plurality of hydraulic lines coupled with said electromagnet adjusters and said at least one adjusting pin for actuating said electromagnet adjusters and said at least one adjusting pin.

12. A method for positioning a plurality of blanks for a welding operation, said method including:

providing a frame having an upper surface extending along a plane;

positioning a plurality of electromagnets on the upper surface of the frame, wherein each of the electromagnets has a top surface extending along a plane being parallel to the plane of the frame;

positioning at least two blanks on top of the top surfaces of at least two of the electromagnets;

pushing the at least two blanks relative to the frame into a preliminary position with at least one adjusting pin;

positioning a plurality of intensifiers of a magnetic material over each of the electromagnets and blanks;

activating at least one of the electromagnets to draw at least one of the blanks and at least one of the intensifiers toward the at least one of the electromagnets to inhibit relative movement between the at least one of the blanks and the at least one of the electromagnets; and moving at least one of the electromagnets with at least one electromagnet adjuster to eliminate any gap between the pair of blanks such that the blanks may be welded to one another;

wherein the at least one electromagnet adjuster includes at least one sliding adjuster configured to push the at least one electromagnet in a horizontal direction being parallel to the plane of the frame, and wherein the method further includes pushing the at least one of the electromagnets in the horizontal direction with the at least one sliding adjuster;

the method further including rotating at least one of the electromagnets about a vertical axis that extends perpendicular to the plane of the frame.

13. The method as set forth in claim 12 wherein positioning the plurality of intensifiers over each of the electromagnets and blanks includes rotating each of the intensifiers from a spaced position in which the intensifiers do not overlie the electromagnets and blanks in a vertical direction of the vertical axis to an overlying position in which the intensifiers overlie the electromagnets and blanks in the vertical direction.

14. The method as set forth in claim 12 further including moving at least one of the electromagnets that has been activated relative to another of the electromagnets that has not been activated.

15. The method as set forth in claim 12 further including welding the at least two blanks to one another.

16. The method as set forth in claim 12 wherein the at least one adjusting pin includes at least one horizontal adjustment pin moveable in the horizontal direction, and wherein pushing the at least two blanks relative to the frame into a preliminary position includes pushing the at least two blanks horizontally with the horizontal adjustment pin.

* * * * *